April 14, 1959   A. F. ZASKEY   2,881,590
LOADING APPARATUS
Filed Dec. 16, 1955   7 Sheets-Sheet 1

INVENTOR.
ARTHUR F. ZASKEY
BY
Christie, Parker & Hale
ATTORNEYS

April 14, 1959  A. F. ZASKEY  2,881,590
LOADING APPARATUS

Filed Dec. 16, 1955  7 Sheets-Sheet 2

INVENTOR.
ARTHUR F. ZASKEY
BY
Christie, Parker & Hale
ATTORNEYS

April 14, 1959 A. F. ZASKEY 2,881,590
LOADING APPARATUS
Filed Dec. 16, 1955 7 Sheets-Sheet 3
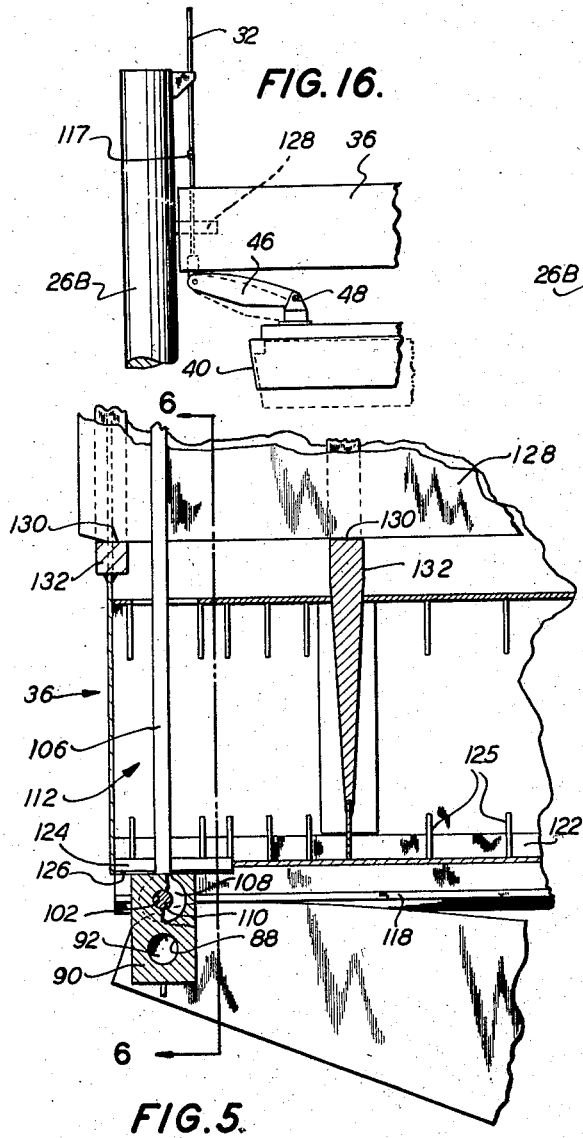
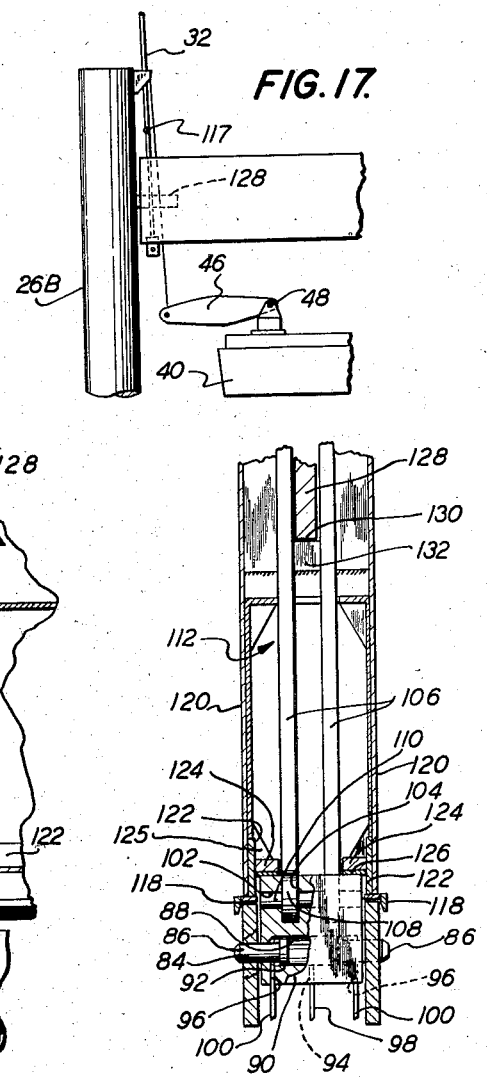
INVENTOR.
ARTHUR F. ZASKEY
BY
Christie, Parker & Hale
ATTORNEYS

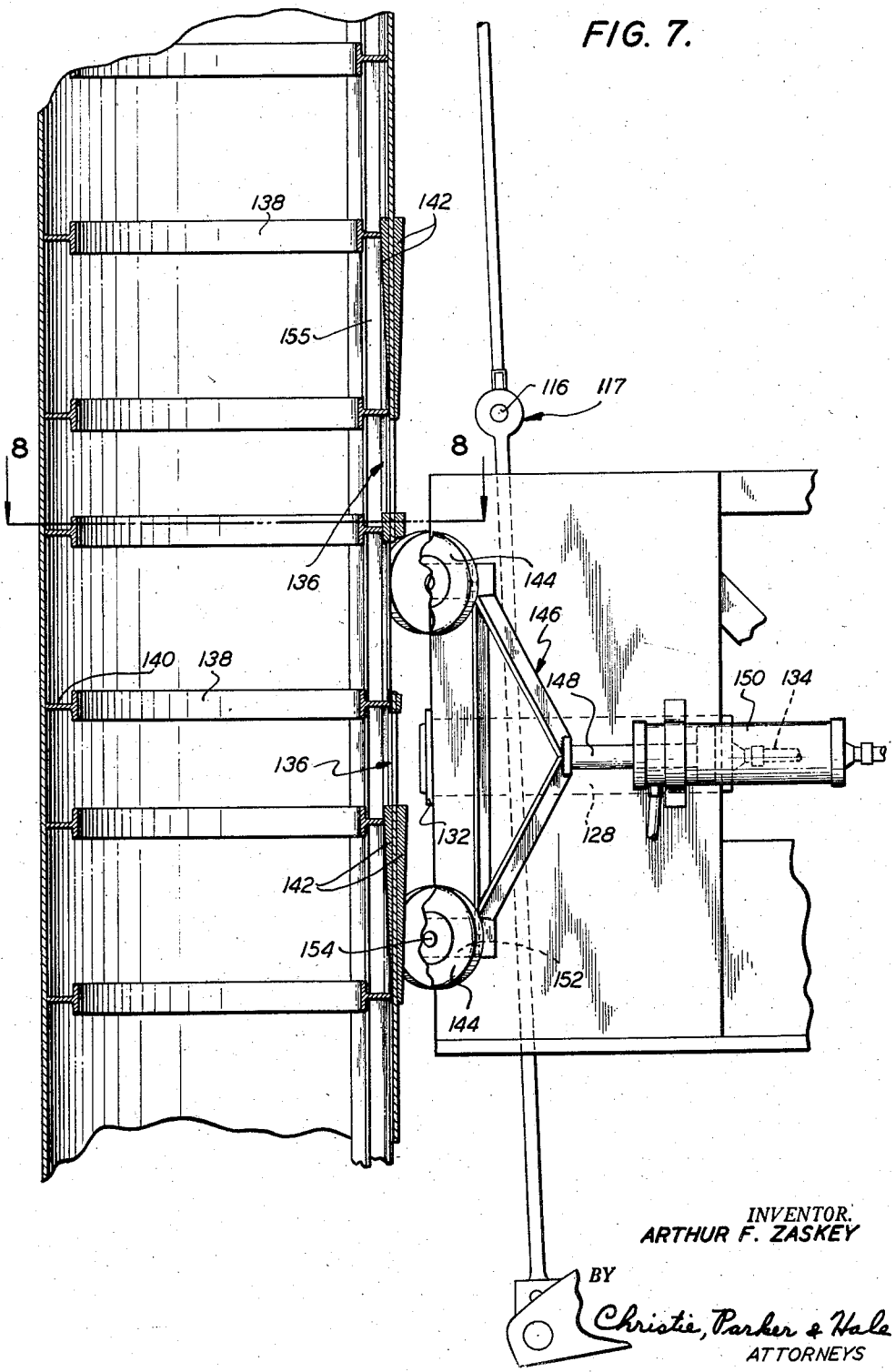

April 14, 1959 A. F. ZASKEY 2,881,590
LOADING APPARATUS

Filed Dec. 16, 1955 7 Sheets-Sheet 5

INVENTOR.
ARTHUR F. ZASKEY
BY
Christie, Parker & Hale
ATTORNEYS

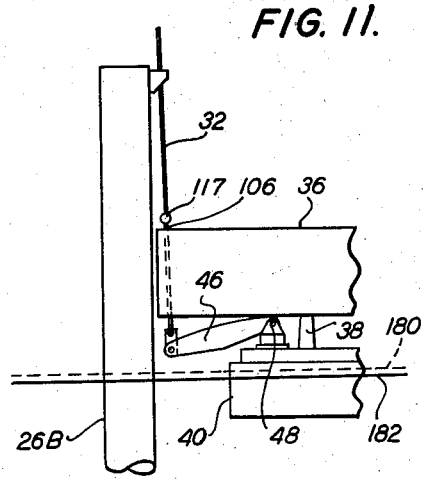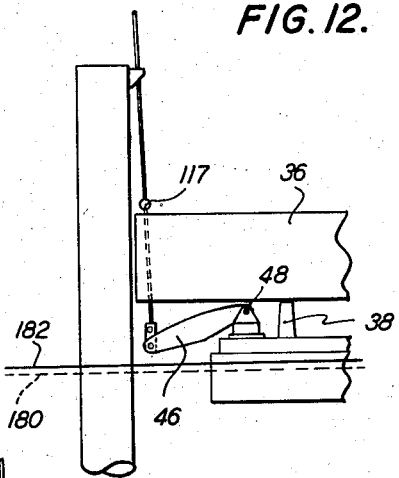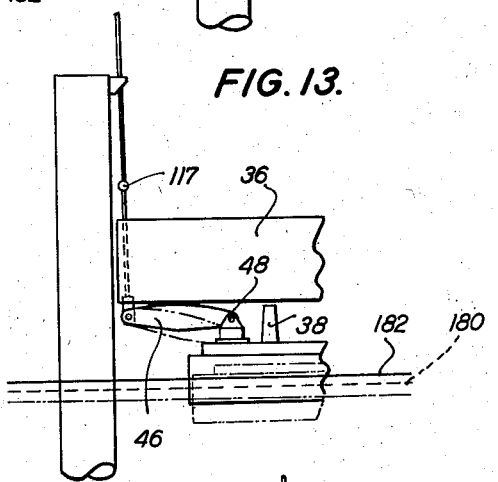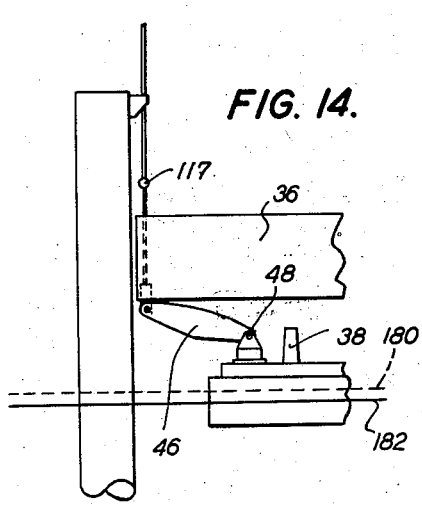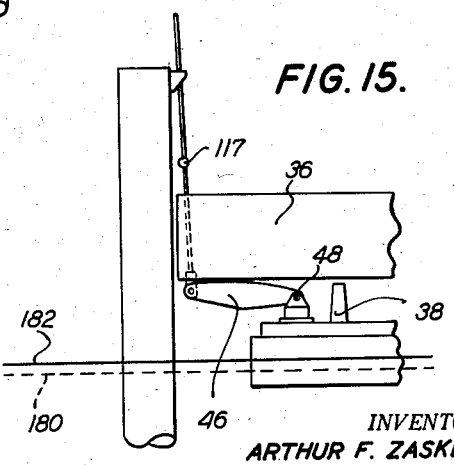

April 14, 1959  A. F. ZASKEY  2,881,590
LOADING APPARATUS

Filed Dec. 16, 1955  7 Sheets-Sheet 7

INVENTOR.
ARTHUR F. ZASKEY
BY
Christie, Parker & Hale
ATTORNEYS

United States Patent Office 2,881,590
Patented Apr. 14, 1959

2,881,590

LOADING APPARATUS

Arthur F. Zaskey, Boston, Mass., assignor to Shell Oil Company, a corporation of Delaware, Continental Oil Company, a corporation of Delaware, The Superior Oil Company, a corporation of California, and Union Oil Company of California, a corporation of California, all of Los Angeles, Calif.

Application December 16, 1955, Serial No. 553,566

10 Claims. (Cl. 61—46.5)

This invention relates to apparatus for transferring a load between two structures having relative movement with respect to each other during the transfer of the load.

Although the loading apparatus of this invention is useful in many applications, it is particularly well suited for transferring a heavy load between a first support and a second support, at least one of the supports being disposed in a body of water and subject to up and down movement due to wave action. In such a situation the problem is presented of transferring the load from one support to the other with the minimum amount of battering of the two supports by the load.

One example of a load to be transferred between two supports, one of which is floating, is a drilling platform which is supported by a floating barge and which is to be transferred to a stationary structure such as that shown in U.S. Patent No. 2,586,966. The drilling platform will ordinarily weigh hundreds of tons and tremendous forces are developed as the waves act on the barge supporting the platform.

This invention provides a simple mechanical arrangement for transferring such a load smoothly and safely between two supports.

Briefly, the invention comprises a rocker beam or arm disposed under a load which, for example, is initially supported on a first structure, such as a floating barge or other suitable vessel. The inner end of the beam is connected to the barge so that the beam can pivot in an up and down direction with respect to the barge. The outer end of the beam is adapted to be connected to a support on a second structure so that the beam can also pivot in an up and down direction with respect to the second structure. Means, such as a hydraulic jack, is provided for raising and lowering the support on the second structure.

Prior to transferring the load from the barge to the second structure, the outer end of the beam is in its lowest position and the load rests on a support on the barge. To effect the transfer, the outer end of the beam is connected to the support on the second structure. Even with the outer end of the beam connected to the support on the second structure, there is sufficient clearance between the upper side of the beam and the bottom of the load so that the waves can move the barge up and down with respect to the second structure and the beam is free to accommodate this motion without engaging the load.

When the load is to be transferred from the barge to the second structure, the jack is actuated to raise the second support and thereby lift the outer end of the beam. The upper side of the beam and the bottom of the load are shaped with respect to each other so that as the outer end of the beam is raised, the load is first engaged by the beam near the inner end of the beam. As the raising of the outer end of the beam by the jack is continued, the point of contact between the load and the beam progressively moves toward the outer end of the beam. During this phase of the operation any up and down motion of the barge due to wave action is accommodated by the pivotal connections at each end of the beam. Thus, as the barge is moved up and down the beam pivots at each end with respect to the barge and the support on the second structure, permitting the point of contact between the load and the beam to move smoothly back and forth along the beam.

As the jack continues to raise the second support, the load is progressively transferred toward the outer end of the beam until finally the load rests fully on the second support at the end of the beam.

The advantage of this arrangement is that the load is transferred gradually from the barge to the second structure. The load is never brought into violent contact with either the support on the barge or the support on the second structure. When the load is carried near the inner end of the beam, the barge carries most of the load, and the load and barge move together so that when the barge is lifted by a wave, the load seats gently on the support on the barge. Conversely, when the load is carried near the outer end of the beam, the load is almost unaffected by movement of the barge and gently seats on the support on the second structure.

For purpose of illustration, the foregoing explanation assumed the load being transferred from a barge to a second structure. The apparatus is used in reverse procedure to transfer the load from the second structure (whether floating or rigidly anchored with respect to wave action) to the barge.

In the preferred arrangement of the apparatus a plurality of spaced beams are used to balance the load, and the inner end of each beam is connected to the barge to permit movement of each beam with respect to the barge in the longitudinal direction of each respective beam.

The invention will be more clearly understood from the following detailed description taken in conjunction with the accompanying drawings in which:

Fig. 5 is a fragmentary sectional elevation, partly broken away, of the outer end of the rocker beam connected to the lower end of the second support;

Fig. 6 is a view, partially broken away, taken on line 6—6 of Fig. 5;

Fig. 7 is a fragmentary sectional elevation, partly broken away, showing the interior structure of one of the legs of the stationary structure and a fender arrangement mounted on the platform to prevent the platform from battering the leg;

Figs. 11 through 17 show schematically a sequence of steps in transferring the load from the barge to the stationary structure;

Figure 2:
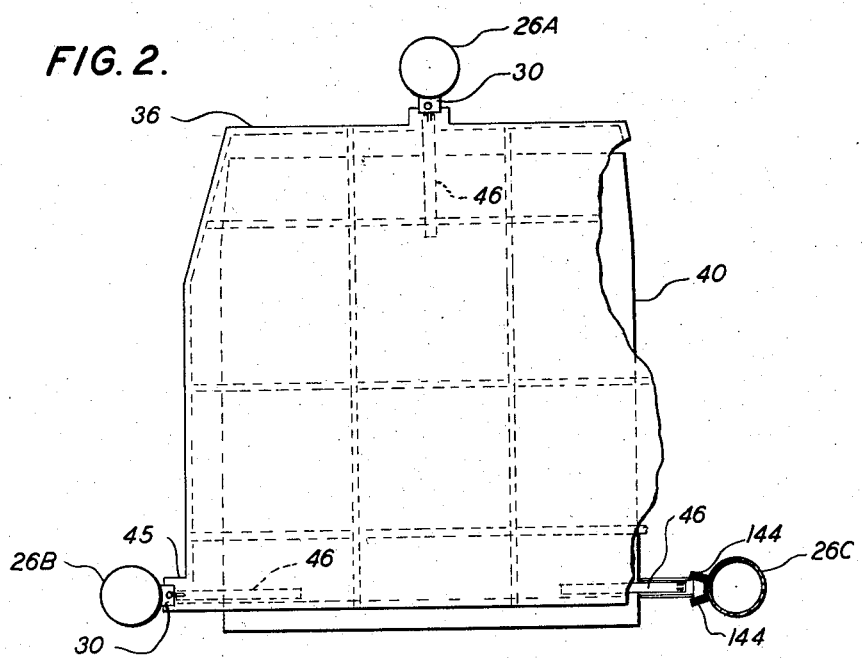
Fig. 2 is a plan view, partly broken away, of the platform, barge and stationary structure shown in Fig. 1.
Figure 1:
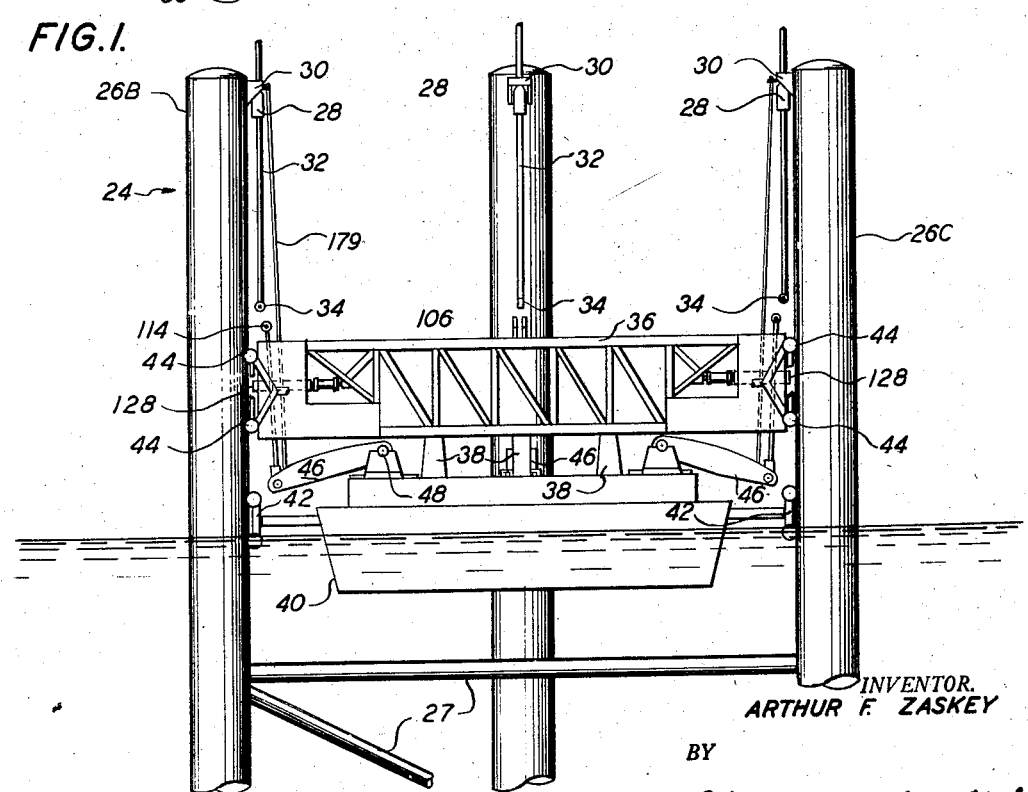
Fig. 1 is a fragmentary schematic elevation showing three rocker beams mounted on a barge so as to be capable of transferring a platform or load from the barge to a stationary structure.

Referring to Figs. 1 and 2, a stationary structure 24 is rigidly anchored at its lower end (not shown) in a body of water 25 which is subject to wave action. The stationary structure may be of any suitable type, and for the purpose of describing this invention, a structure such as that illustrated in U. S. 2,586,966 is used. This structure includes three upright parallel tubular legs 26A, 26B, and 26C each being equally spaced from the other two and interconnected substantially below water level by suitable cross bracing 27. For convenience of reference this structure is subsequently referred to as the "tripod."

A separate jack 28 is attached to the upper end of each leg by means of a separate bracket 30 welded to the side of each leg facing inwardly. The upper end of an externally threaded hanger bar 32 is supported by each jack in a manner described in detail below in connection with Figs. 9 and 10. An eye 34 is formed at the lower end of each hanger bar.

A flat-bottomed platform 36, which is the "load" to be transferred, rests on three blocks or first supports 38 provided on the deck of a barge 40 adapted to be floated in between the upper ends of each of the legs of the tripod. Each of the first supports is located on the barge deck near a respective tripod leg.

Both the platform and the barge are generally square in plan each having one side slightly shorter than the other three sides to facilitate floating the barge and platform in between the tripod legs. In the transferring position, the short sides of the barge and platform are adjacent a central leg 26A of the tripod (see Fig. 2) with the central leg equidistant from each end of the short sides. In this position, the sides of the barge and platform opposite the short sides terminate adjacent the left and right legs 26B, 26C.

Three barge fenders 42 are provided on the barge so that each barge fender can be actuated to engage a tripod leg. Three platform fenders 44 are disposed on the platform so that each platform fender can be actuated to engage a respective tripod leg.

The fenders on the platform are attached to opposite sides of outwardly extending projections 45 formed integrally on the platform adjacent each tripod leg. The fenders serve to center the barge and platform within the tripod and prevent battering of the tripod by the barge and the platform. The fenders are described in more detail in connection with Figs. 5 and 6.

Figure 3:
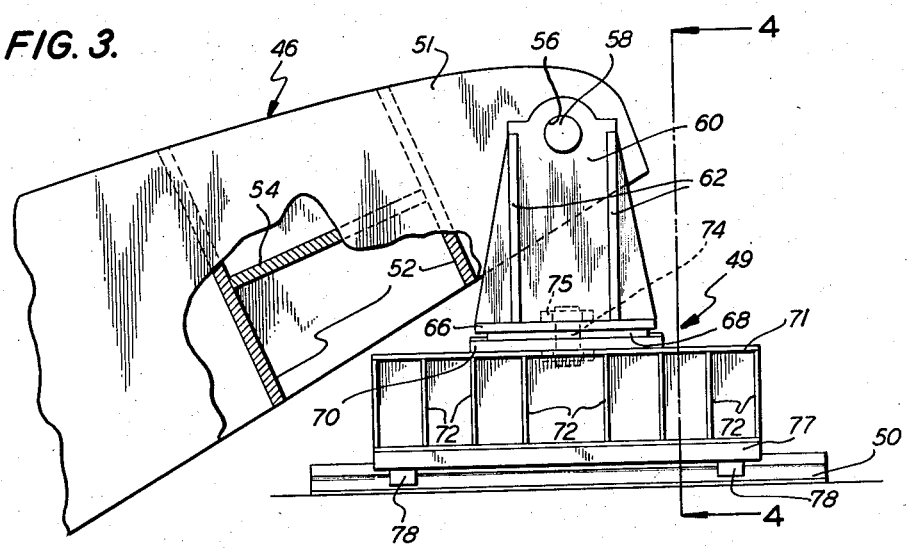
Fig. 3 is a fragmentary side elevation, partly broken away, of the inner end of a rocker beam mounted on the barge to permit longitudinal sliding of the beam with respect to the barge.
Figure 4:
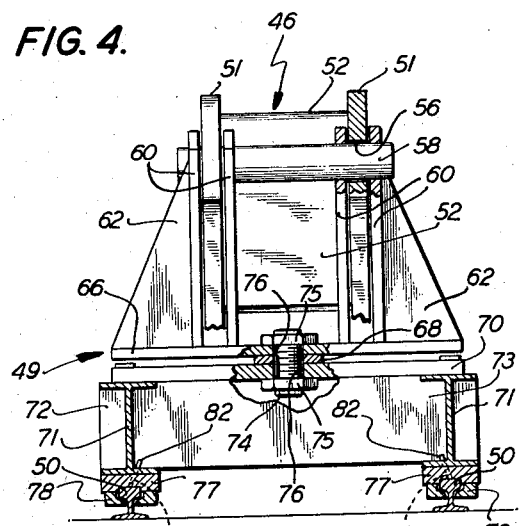
Fig. 4 is a view taken on line 4—4 of Fig. 3.

Three rocker beams or arms 46 are disposed on the barge so that the inner end of each beam is pivotally connected at 48 to the barge just outwardly of a respective block or first support 38. Each beam extends outwardly toward a respective leg of the tripod and terminates with the outer end just short of the respective tripod leg. Since the three rocker beams are identical, the following description of one will suffice for the other two. Referring to Figs. 3 and 4, the inner end of the rocker beam is carried by a truck 49 adapted to slide longitudinally of the beam on a pair of rails 50. The rocker beam 46 comprises a pair of upright, outwardly extending, parallel side plates 51 of identical size and shape. The plates are connected together and reinforced intermediate their ends by a plurality of vertical (when the rocker beam is in a horizontal position) braces 52 and a plurality of horizontal braces 54, the braces being welded to the inner surfaces of the side plates and to each other. The upper edge of each side plate is provided with a slight convex curvature, so that when the rocker beam pivots upwardly with respect to the barge, the flat bottom of the platform is first engaged by the rocker beam adjacent the inner end of the beam and the point of contact between the platform bottom and beam moves outwardly.

Each of the inner ends of the side plates is provided with a transverse bore 56, through which there is disposed a pin 58. The inner end of each rocker beam is supported by means of pin 58 extending between a pair of upright support plates 60 which in turn are reinforced by transverse gussets 62.

The various plates which form the support for the inner end of the beam are welded to the top of a bottom plate 66 which in turn rests on a resilient pad 68 supported on the upper surface of a truck plate 70 which in turn is welded to the upper flanges of a pair of spaced I-beams 71 extending in the same direction as the beam and reinforced by transverse external gussets 72 and internal gussets 73. A vertical threaded king pin 74 and a support nut 75 at each end of the king pin hold the bottom plate to the truck plate. A bore 76 in the bottom plate, which accommodates the king pin, is slightly enlarged to permit limited pivoting of the inner end of the rocker beam about a horizontal longitudinal axis.

A separate elongated footing 77 is welded to the bottom flange of each I-beam and is adapted to ride on the rails 50. A pair of longitudinally spaced clamps 78 welded to the bottom of each footing are adapted to grip the upper edge of each rail and prevent the truck from tilting off the rail. A lubricating bore 80 is provided through each I-beam and footing, and supplies a lubricating fluid under high pressure from a supply line 82 to insure that the truck is free to slide on the rails.

Referring to Figs. 5 and 6, the outer end of each of the rocker beam side plates is provided with a transverse bore 84 to receive a respective plunger 86 mounted in a transverse bore 88 in a second support block 90. The bore 88 is stepped down to a reduced diameter at each end to fit snugly around the plunger 86 disposed at that end. The inner end of each plunger is provided with a section 92 of increased diameter which forms a close fit within the intermediate portion of bore 88. A vertical bore 94 located in the bottom and central portion of the second support block 90 communicates with the intermediate portion of bore 88. A separate vertical bore 96 is formed in the bottom of the second support block at each end of the bore 88. The outer ends of bore 88 are tapered to a reduced diameter and the bores 96 enter bore 88 in the tapered section. The tapered section prevents the enlarged portion of the plunger from closing the bores 96.

A line 98 is connected to a source of hydraulic liquid (not shown) which supplies fluid pressure to bore 94 to force the plungers outwardly into the respective bores of the rocker beam side plates. The second support block may be released from the outer end of the rocker beam by supplying fluid pressure to the bores 96 through hydraulic lines 100 from a suitable source (not shown) to force the plungers into the center of the second support block. The fluid between the two plungers being displaced out of the bore 94.

A second transverse bore 102 is formed directly above bore 88 in the second support block. A pair of laterally spaced vertical slots 104 are milled in the upper surface of the second support block and traverse the bore 102. The lower end of a pair of vertical eye bars 106 is disposed within each slot 104 and an eye 108 formed integrally in the lower end of each eye bar receives a pin 110 which is press fitted in the bore 102 to secure the second support block to the eye bars. The eye bars extend upwardly through an open space 112 in the platform and project a relatively short distance above the platform. An eye 114 is integrally formed at the upper end of each eye bar and spaced so that the eye 34 at the lower end of the hanger bar 32 makes a close fit therebetween. The eyes 34 and 114 are adapted to be connected by a pin 116 (see Fig. 7) to form a flexible knuckle joint 117.

Still referring to Figs. 5 and 6, the bottom edge of the barge which overlies the upper edge of the rocker beam includes two laterally spaced, parallel, L-shaped tracks 118, each track being welded to the bottom edge of a separate vertical plate 120 which forms the lower portion of projection 45 on the platform. Each L-shaped track is arranged to extend over and down the outside of a respective side plate of the rocker beam. Thus, the tracks cooperate to prevent the platform from sliding laterally off the rocker beam. A relatively short upright reinforcing plate 122 is welded to the inside surface of each plate 120 and rests on the top of a respective track. A separate, inwardly extending bearing plate 124 is welded to the intermediate portion of each reinforcing plate 122 and is arranged to engage the upper surface of the second support block 90. A plurality of vertical gussets 125 are welded to the inside of each plate 122 and to the upper surface of each bearing plate. A separate resilient pad 126 is secured to the bottom surface of each bearing plate to provide a shock mounting for the platform on the second support block. Thus, the eye bars 106 serve the double function of carrying the second support block which in turn is adapted to support the platform and also raises and lowers the outer end of the rocker beam. By means of the source of hydraulic fluid located on the platform, the second support block may be connected and disconnected from the outer end of the rocker beam as required.

An elongated, platform support key 128 is carried within the platform directly above the rocker beam and extends in the same direction as the rocker beam. The key is adapted to slide longitudinally through a pair of separate slots 130 formed in a pair of vertical wedges 132 welded within the platform and spaced longitudinally along the key. When the key is in a retracted position, the outer end of the key projects slightly beyond the edge of the platform adjacent the tripod leg.

The key is adapted to be moved longitudinally by a piston 134 (see Fig. 7) connected to the inner end of the key. Suitable means (not shown) are provided for actuating the piston 134.

Figure 8:
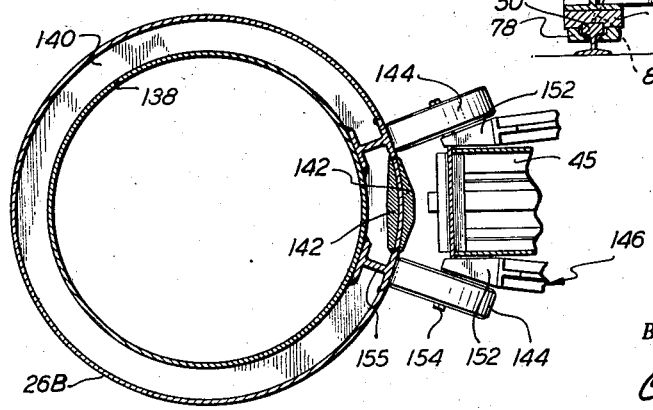
Fig. 8 is a view taken on line 8—8 of Fig. 7.

As can be seen most clearly in Figs. 7 and 8, the portion of the tripod leg normally disposed above the water level is provided with a plurality of vertically spaced slots 136 adjacent the projection 45 on the platform and shaped to receive the key 128. Directly above and below each slot 136 a short stiffening ring 138 of slightly less diameter than the inside diameter of the leg is supported coaxially in the leg by an annular horizontal disc 140 welded to the outside of the ring and the inside of the leg. Directly below each slot 136 the wall of the tripod leg is reinforced by a pair of opposing wedges 142 welded to the outer and inner surface of the tripod leg wall. Thus, when the barge is hoisted to the desired elevation, it may be locked in place by actuation of the piston 134 to drive the key into the proper slot 136. This arrangement permits the platform to be supported directly by the tripod leg.

As mentioned previously, a plurality of support fenders are provided on the platform and barge adjacent each leg of the tripod to prevent battering of the tripod by the barge or the platform. The fenders are identical and a description of one of them will suffice for the rest. For convenience, one of the fenders on the platform is described. This fender is shown most clearly in Figs. 7 and 8. Each fender comprises a pair of vertically spaced pneumatically inflated wheels 144 carried on the outer end of a fender bracket 146. The inner end of the bracket is connected to a piston 148 which is actuated to move toward and away from the proximate tripod leg by a source of hydraulic fluid (not shown) adapted to be supplied to a cylinder 150 in which the piston 148 is disposed. The upper and lower outer portions of the bracket each carry a separate wedge-shaped block 152 which is tapered so that its outer surface extends radially with respect to the tripod leg. Each wheel is rotatably carried by a separate horizontal axle 154 mounted in the wedge so that each wheel extends radially with respect to the tripod leg and can be forced to bear against the leg. Each portion of the tripod leg which receives thrust from a pair of fender wheels is reinforced by separate upright I-beams 155 having their flanges curved to match respectively, the contour of the inside of the tripod leg and the outer periphery of the stiffening rings 138, the flanges of the I-beams being welded to the tripod leg and stiffening rings.

As can be seen from Fig. 8, there is a separate pair of fender wheels mounted on each side of the projection 45. Thus, when the barge and platform are in position within the tripod legs and all fenders are actuated to centralize the barge and platform, the fender wheels prevent the barge from slipping out of position during the transfer of the platform between the barge and the tripod.

Figure 9:
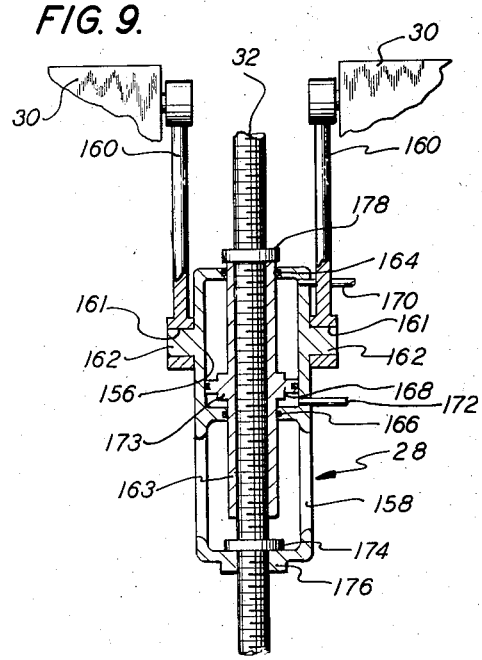
Fig. 9 is a sectional elevation of a jack mounted on the stationary structure to raise and lower the second support.
Figure 10:
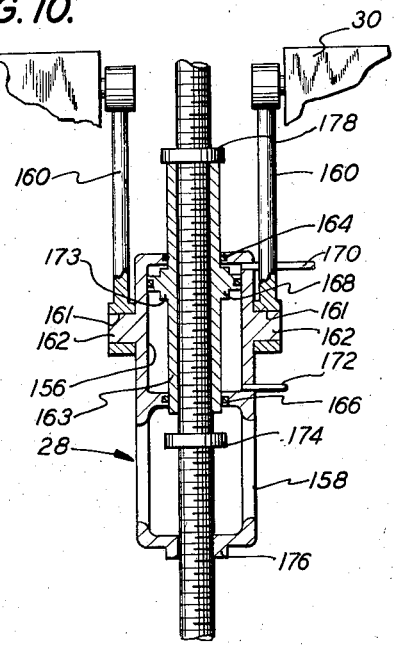
Fig. 10 is a sectional elevation of the jack of Fig. 9 in a different operating position.

The jack 28 for raising and lowering the hanger bar is shown in detail in Figs. 9 and 10. The jack includes a closed cylinder 156 with a depending open cage 158. The jack is supported from the tripod by the bracket 30 which in turn carries a pair of downwardly extending arms 160, each mounted to pivot about a horizontal axis. The lower end of each arm 160 has a transverse bore 161 to receive trunnions 162 formed integrally on the outer wall of the cylinder. The hanger bar 32 is threaded externally and extends up through a sleeve 163 which extends coaxially through the cylinder. An upper fluid tight seal 164 and a lower fluid tight seal 166 seals the space between the cylinder and the sleeve so that the sleeve can slide longitudinally within the cylinder and project above and below the cylinder.

An annular piston 168 is integrally formed around the intermediate portion of the sleeve and is of such external diameter as to make a close fit against the inside of the cylinder wall. An upper conduit 170 opens into the cylinder above the piston and a lower conduit 172 opens into the conduit below the piston. Conduit 170 and 172 are connected to a suitable source of fluid pressure so that the piston may be reciprocated within the cylinder. An annular shoulder 173 on each side of the piston 168 adjacent the sleeve prevents the piston from closing conduits 170 and 172.

A lower locking nut 174 is threaded to the hanger bar 32 below the lower end of the sleeve and is adapted to rest on an annular, inwardly extending projection 176 at the lower end of the cage 158. An upper locking nut 178 is threaded on to the hanger bar above the upper end of the sleeve and is adapted to be engaged thereby.

The jack shown in Figs. 9 through 10 is operable to raise or lower the hanger bar in increments which are almost equal to the length of the jack cylinder. For example, to raise the hanger bar the jack is in the position in Fig. 9, i.e., the lower locking nut 174 rests on the cage projection 176. To raise the hanger bar, fluid is introduced into the cylinder through lower conduit 172, causing the piston to rise and force the fluid from the cylinder out the upper conduit 170. This moves the sleeve to the position shown in Fig. 10 and raises the hanger bar by an amount almost equal to the length of the cylinder. The lower locking nut is then run down to rest on the cage projection 176 and support the hanger bar. Fluid is then introduced into the cylinder through conduit 170 and bled from the cylinder from conduit 172. This forces the piston and sleeve back down to the position in Fig. 9, the load on the hanger bar still being supported by the lower locking nut. The upper locking nut is then run down the hanger bar to engage the upper end of the sleeve, and the preceding cycle is then repeated as many times as necessary to raise the hanger the required amount.

To lower the hanger bar, the above procedure is reversed, using the upper locking nut to support the hanger bar as the sleeve is lowered in the jack and using the lower locking nut to support the hanger bar stationary as the upper locking nut and sleeve are run to the uppermost position for the sleeve to repeat the lowering step.

The operation of the apparatus to transfer the platform from the barge to the tripod can be understood most readily from reference to Figs. 11 through 17. Each figure shows schematically the operation of one of the rocker beams, for example, the rocker beam adjacent leg 26B. The operation of this rocker beam is identical to that of the other two. The three beams are actuated simultaneously to effect a uniform transfer of the load to the tripod.

Starting with Fig. 11, the barge is floated into position within the tripod and the fenders on the barge and platform are actuated to engage the tripod legs. The hanger bar 32 and the eye bars 106 are connected at the knuckle joint, using a support cable 179 (see Fig. 1) attached to the outer end of the rocker beam and the upper end of the tripod leg to hold the beam up in the required position. The cable is then disconnected from the rocker beam. The dotted line 180 indicates the mean level of the water and the solid line 182 indicates the level of the water due to wave action. As can be seen from Figs. 11 and 12, when the knuckle joint is initially connected, the outer end of the rocker beam is disposed at a sufficiently low level so that the wave action on the barge merely causes the beam to move up and down without engaging the platform, the platform always being supported by the support blocks 38 at this stage of the hoisting operation. The jack is then actuated to raise the hanger bar and second support block 90.

Fig. 13 shows the position of the rocker beam during the intermediate stage of the hoisting operation. The phantom line in Fig. 13 shows the action of the rocker beam as the barge is moved up and down by wave action.

Fig. 14 shows the position of the rocker beam with the hanger bar nearing the upper end of its travel, the barge being in the trough of a wave. Fig. 15 is the same position for the hanger bar, the barge being on the crest of a wave. The sequence of Figs. 11 through 15 shows that as the outer end of the rocker beam is raised, the upper edge of the rocker beam engages the under side of the platform. Since the platform bottom is flat, and the upper edge of the rocker beam is provided with a convex curvature, the rocker beam first engages the platform at a point near the inner end of the rocker beam. As the outer end of the rocker beam is raised further, the point of contact between the rocker beam and the platform moves smoothly outwardly. As the barge is moved up and down due to wave action, the rocker beam pivots both with respect to the barge and with respect to the hanger bar. This also causes the point of contact between the rocker beam and the platform to move longitudinally along the rocker beam during the hoisting operation. Thus, the load of the platform is gradually transferred from the barge to the hanger bar as the outer end of the rocker beam is raised. The distribution of the load from the platform on the hanger bar and the barge at any given instant depends upon the point of contact between the rocker beam and the platform. At the beginning of the hoisting operation, when the contact is adjacent the inner end of the rocker beam, a relatively small amount of the load is carried by the hanger bar. As the hanger bar is raised and the point of contact between the rocker beam and the platform moves outwardly, the load on the barge is decreased and the load supported by the hanger bar is increased. Due to this action, there is no sudden or violent contact between either the platform and the barge or the platform and the second support 90 carried at the lower end of the eye bars. For example, if during the initial stages of the hoisting operation a large wave lifts the barge upwardly, the support 38 on the barge does not strike the platform with a shock impact because as the barge moves upwardly, the point of contact between the platform and the rocker beam moves inwardly so that by the time the support engages the bottom of the platform, most of the platform load is on the barge and the platform movement practically coincides with that of the barge.

The hoisting of the hanger bar is continued until the platform is raised to the desired position. In this position the platform is supported completely by the second support carried at the lower end of the hanger bar and the up and down movement of the barge due to wave action merely causes the rocker beam to pivot from the solid to the phantom line positions shown in Fig. 16.

During the hoisting operation the fender wheels on both the barge and the platform roll up and down the legs of the tripod to accommodate the pitch and roll of the barge due to wave action. These fender wheels prevent the barge and platform from battering the tripod. Each of the three pistons associated with each of the keys 128 are then driven outwardly to force each key into a respective slot in the tripod legs. The jacks are then actuated to lower the platform so that the full load of the platform is carried by the tripod legs at the point where the legs are engaged by the keys.

Referring to Fig. 17, the support cable is again connected to the outer end of the rocker beam. The plungers in the second support block (see Fig. 6) are actuated by hydraulic pressure through lines 100 to be driven inwardly so that the outer end of the rocker beam is released from the second support block. The rocker beam is then lowered gently by means of the cable to rest on the barge deck. The cable is then disconnected from the rocker beam. The fenders on the barge are then retracted and the barge is removed.

With the platform supported by the tripod, it is then ready for its intended use, e.g., drilling, radar station, etc.

In the event the platform is to be removed, the above procedure is reversed. The jacks are actuated to place the load of the platform on the second support blocks 90. The keys are withdrawn from the slots in the legs and the platform fenders are actuated to engage their respective tripod legs. The barge is floated into position under the platform and the barge fender wheels are extended to engage the tripod legs. The support cable is connected to the outer end of the rocker beam and used to raise the beam until it is in the solid line position shown in Fig. 16. The plungers in the second support block 90 are actuated by the application of fluid pressure through line 98 so that they are driven outwardly to fit into the bores in the outer end in each rocker beam side plate. The jack is then actuated to lower the outer end of the rocker beam until the platform rests on the first support blocks 38. The hanger is then lowered a short distance farther and a strain is taken on the outer end of the rocker beam by means of the support cable. The knuckle joint is then disconnected and the rocker beam is lowered gently to the deck of the barge by means of the support cable which is then disnected from the rocker beam. All fenders are then retracted and the barge and platform are floated out of the tripod.

As the platform is raised and lowered, it is desirable that the inner end of the rocker beam be movable longitudinally with respect to the barge. As explained previously, the mounting of the inner end of the rocker beam of the truck 49 which slides on the rails 50 carried by the barge permits the necessary longitudinal movement of the inner end of the beam.

Figure 19:
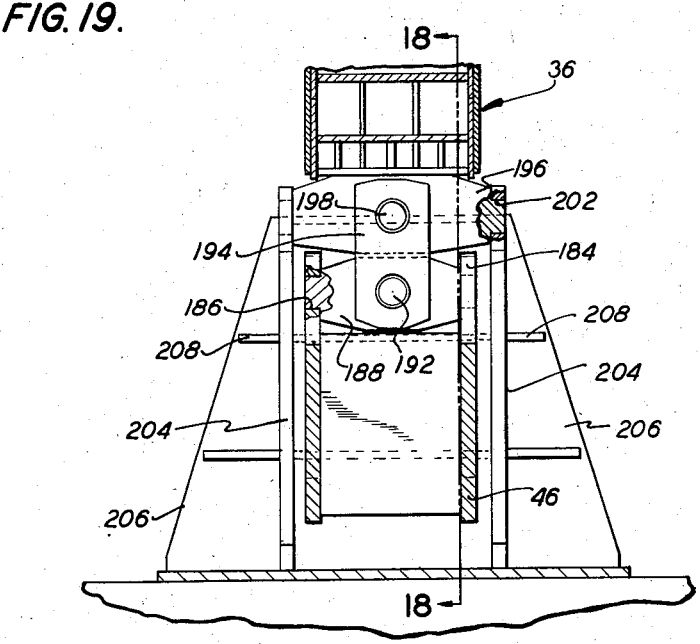
Fig 19 is a view taken on line 19—19 of Fig. 18.
Figure 18:
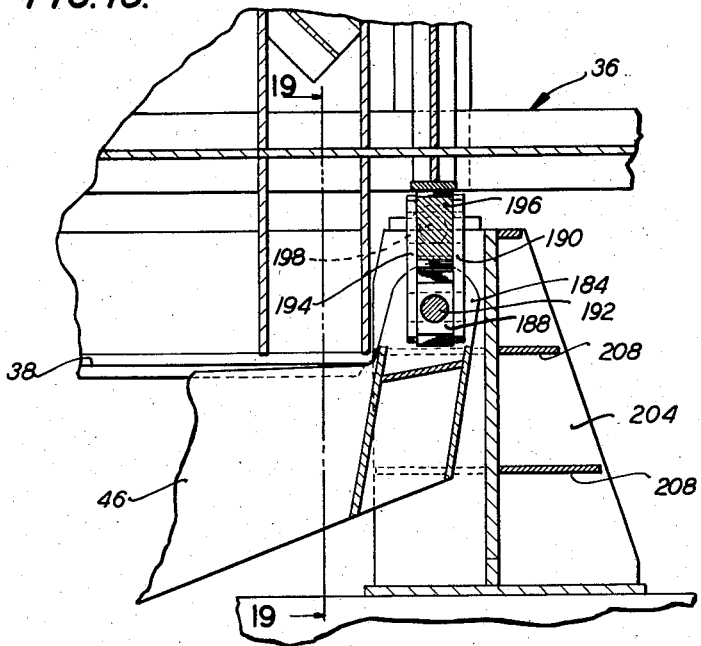
Fig. 18 is a fragmentary sectional elevation taken on line 18—18 of Fig. 19 showing an alternate arrangement for mounting the inner end of the rocker beam on the barge.

Figs. 18 and 19 show another embodiment for mounting the inner end of the rocker beam to the barge to permit longitudinal movement of the beam. As viewed in Fig. 18, the bottom of the platform and the top edge of the rocker beam 46 are constructed as described previously. However, the inner end of the beam and its mounting differ from the previously described arrangement as follows. The upper edge of the inner end of each beam side plate is provided with an integrally formed upwardly extending ear 184. Each ear has a transverse bore 186 to receive opposite ends of a lower toggle 188 disposed between the ears. The lower toggle is of relatively large diameter at its intermediate portion and is tapered to a reduced diameter adjacent the inner surface of each ear. The lower toggle is stepped down to a diameter which fits snugly but pivotally within each bore 186 in the ears. Thus, the inner end of the beam is free to pivot about a first horizontal transverse axis.

An upright rear suspension plate 190 is pivotally connected at its lower end to the center of the lower toggle 188 by a horizontal pin 192 which extends longitudinally through the toggle in the direction of the longitudinal axis of the beam and pivotally connects the lower end of a front plate 194 to the side of the toggle nearer the proximate tripod leg. The upper end of the rear and forward suspension plates are pivotally connected on opposite sides of a second or upper toggle 196, extending in the same direction as the lower toggle, by means of an upper pin 198. The intermediate portion of the upper toggle is relatively thick and flattened on its upper surface. The upper toggle is also tapered to a reduced thickness at each end. The upper toggle is of a reduced diameter at each end which fits into a respective transverse bore 202 in the upper end of each of a pair of laterally spaced vertical support plates 204 welded to the deck of the barge to extend longitudinally on the outside and at the inner end of each rocker beam side plate. Each support plate 204 is reinforced and supported by gussets 206. Horizontal reinforcing plates 208 are welded to the gusset and the support plates.

With the arrangement shown in Figs. 18 and 19 the upper flattened surface of the upper toggle serves as a first upper support for the platform when it is resting on the barge. As the outer end of the beam is raised, the upper convex edge of the beam engages the platform adjacent the inner end of the beam and lifts the platform from the upper toggle. This leaves the inner end of the beam free to pivot with respect to the barge about two vertically displaced horizontal transverse axes, and permits longitudinal movement of the inner end of the beam with respect to the barge. The pivotal connections of the suspension plates between the upper and lower toggles also permit rotation of the rocker beam about a pair of longitudinal axes which further accommodates the pitch and roll of the barge. This last described arrangement for supporting the inner end of the rocker beam has the advantage that the beam support and platform support blocks are combined and a truck sliding on a rail is eliminated.

In the foregoing description, a jack is described as the means for effecting the necessary relative up and down movement between the supports on the barge and on the tripod. However, any other suitable system may be used. For example, the draft of the barge may be changed by controlled flooding and dewatering to obtain the necessary variation in the elevation of the supports. With this latter arrangement, the need for a jack is eliminated.

I claim:

1. Apparatus for transferring a load between a first structure and a second structure, the load having a bearing surface, the apparatus comprising a first support on the first structure for supporting the load, a second support on the second structure for supporting the load, a beam having a bearing surface disposed under the load bearing surface, a first pivot connecting one end of the beam to the first structure so that the beam is pivotable up and down with respect to the first structure, a second pivot connecting the other end of the beam to the second support so that the beam is pivotable up and down with respect to the second support, and means for effecting relative up and down movement between the two supports to bring the two bearing surfaces into contact.

2. Apparatus for transferring a load between a first structure and a second structure, the load having a bearing surface, the apparatus comprising a first support on the first structure for supporting the load, a second support on the second structure for supporting the load, a beam having a bearing surface disposed under the load bearing surface, at least one of the bearing surfaces being convex and having a radius of curvature no greater than that of the other surface, a first pivot connecting one end of the beam to the first structure so that the beam is pivotable up and down with respect to the first structure, a second pivot connecting the other end of the beam to the second support so that the beam is pivotable up and down with respect to the second support, and means for effecting relative up and down movement between the two supports to bring the two bearing surfaces into contact.

3. Apparatus for transferring a load between a first structure and a second structure, the load having a bearing surface, the apparatus comprising a first support on the first structure for supporting the load, a second support on the second structure for supporting the load, a beam having a bearing surface disposed under the load bearing surface, at least one of the bearing surfaces being convex and having a radius of curvature no greater than that of the other surface, first means connecting one end of the beam to the first structure so that the beam is longitudinally movable and pivotable up and down with respect to the first structure, a second means pivotally connecting the other end of the beam to the second support so that the beam is pivotable up and down with respect to the second support, and means for effecting relative up and down movement between the two supports to bring the two bearing surfaces into contact.

4. Apparatus for transferring a load between a first structure and a second structure, the load having a bearing surface, the apparatus comprising a first support on the first structure for supporting the load, a second support on the second structure for supporting the load, a beam having a bearing surface disposed under the load bearing surface, at least one of the bearing surfaces being convex and having a radius of curvature no greater than that of the other surface, means connecting one end of the beam to the first structure so that the beam is longitudinally movable and pivotable up and down with respect to the first structure, a second pivot connecting the other end of the beam to the second support so that the beam is pivotable up and down with respect to the second support, and means for effecting relative up and down movement between the two supports to bring the two bearing surfaces into contact.

5. Apparatus for transferring a load between a first structure and a second structure, the load having a bearing surface, the apparatus comprising a first support on the first structure for supporting the load, a second support on the second structure for supporting the load, a beam having a bearing surface disposed under the load bearing surface, at least one of the bearing surfaces being convex and having a radius of curvature no greater than that of the other surface, a first pivot connecting one end of the beam to the first structure so that the beam is pivotable up and down with respect to the first structure, means for releasably connecting the other end of the beam to the second support so that the beam is pivotable up and down with respect to the second support, and means for effecting relative up and down movement between the two supports to bring the two bearing surfaces into contact.

6. Apparatus for transferring a load between a first structure and a second structure, the load having a bearing surface, the apparatus comprising a first support on the first structure for supporting the load, an upright hanger bar, means for supporting the bar at its upper portion from the second structure, a second support for supporting the load, means for releasably connecting the second support to the lower portion of the hanger bar, means for moving the bar up and down and holding it in any of a plurality of vertically spaced positions, a beam having a bearing surface disposed under the load bearing surface, at least one of the bearing surfaces being convex and having a radius of curvature no greater than that of the other surface, a first pivot connecting one end of the beam to the first structure so that the beam is pivotable up and down with respect to the first structure, a second pivot connecting the other end of the beam to the second support so that the beam is pivotable up and down with respect to the second support, and means for effecting relative up and down movement between the two supports to bring the two bearing surfaces into contact.

7. Apparatus for transferring a load between a first structure and a second structure, the load having a bearing surface, the apparatus comprising a first support on the first structure for supporting the load, an upright hanger bar, a jack carried by the second structure and connected to the hanger bar to raise and lower it, a second support for supporting the load, means for connecting the second support to the hanger bar, a beam having a bearing surface disposed under the load bearing surface, a first pivot connecting one end of the beam to the first structure so that the beam is pivotable up and down with respect to the first structure, a second pivot connecting the other end of the beam to the second support so that the beam is pivotable up and down with respect to the second support, and means for operating the jack to effect relative up and down movement between the two supports to bring the two bearing surfaces into contact.

8. Apparatus for transferring a load between a first structure and a second structure, the load having a bearing surface, the apparatus comprising a first support on the first structure for supporting the load, a second support on the second structure for supporting the load, an elongated beam having a bearing surface disposed under the load bearing surface, at least one of the bearing surfaces being convex and having a radius of curvature no greater than that of the other surface, means connecting one end of the beam to the first structure so that the beam is pivotable up and down with respect to the first structure about two axes transverse to the longitudinal axis of the beam and located at different elevations, a second pivot connecting the other end of the beam to the second support so that the beam is pivotable up and down with respect to the second support, and means for effecting relative up and down movement between the two supports to bring the two bearing surfaces into contact.

9. Apparatus for transferring a load between a vessel floating in water and a second structure having a plurality of legs, the load having a bearing surface, the apparatus comprising a first support on the first structure for supporting the load, a separate second support carried by each leg of the second structure for supporting the load, a separate second support carried by each leg of the second structure for supporting the load, a separate beam for each leg, each beam extending outwardly from the vessel toward a respective leg and having a bearing surface disposed under the load bearing surface, a first pivot connecting the inner end of each beam to the vessel so that the beams are pivotable up and down with respect to the vessel, a second pivot connecting the outer end of each beam to a respective proximal second support so that each beam is pivotable up and down with respect to its second support, and means for effecting relative up and down movement between the first and second supports to bring the two bearing surfaces of the beam and load into contact.

10. Apparatus according to claim 9, which includes fendering means on the vessel and load for restraining the vessel and load from lateral movement with respect to the legs of the second structure as the first and second supports are moved up and down with respect to each other.

References Cited in the file of this patent

UNITED STATES PATENTS

| | | |
|---|---|---|
| 467,079 | Bruhl | Jan. 12, 1892 |
| 1,415,532 | DeVito | May 9, 1922 |
| 2,482,788 | Moon | Sept. 27, 1949 |
| 2,720,017 | Youtz | Oct. 11, 1955 |